United States Patent
Kim et al.

(10) Patent No.: US 7,583,887 B2
(45) Date of Patent: Sep. 1, 2009

(54) RECORDING MEDIUM HAVING DATA STRUCTURE FOR MANAGING MAIN DATA ADDITIONAL CONTENT DATA THEREOF AND RECORDING AND REPRODUCING METHODS AND APPARATUSES

(75) Inventors: Byung Jin Kim, Kyunggi-do (KR); Jea Yong Yoo, Seoul (KR); Mi Hyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1063 days.

(21) Appl. No.: 10/851,157

(22) Filed: May 24, 2004

(65) Prior Publication Data

US 2004/0240360 A1    Dec. 2, 2004

(30) Foreign Application Priority Data

May 27, 2003   (KR)   ..................... 10-2003-0033664

(51) Int. Cl.
*H04N 7/00* (2006.01)
*H04N 5/00* (2006.01)
*H04N 7/16* (2006.01)
*H04N 7/173* (2006.01)
*H04L 9/08* (2006.01)
*G06F 3/00* (2006.01)
*G11B 5/09* (2006.01)
*G11B 7/00* (2006.01)
*G11B 7/24* (2006.01)
*G11B 7/085* (2006.01)

(52) U.S. Cl. .................. 386/95; 386/125; 386/126; 369/30.07; 369/47.19; 369/53.31; 380/278; 715/744; 720/718; 725/112; 725/113; 725/133; 725/153

(58) Field of Classification Search ............. 386/95, 386/125, 126, E5.028, E9.05, E9.013, E9.036, 386/E9.04; 369/30.07, 47.19, 53.31; 380/278; 707/E17.009, E17.119; 715/744; 725/112, 725/113, 133, 153; 720/718
See application file for complete search history.

(56) References Cited

U.S. PATENT DOCUMENTS 6,009,433 A * 12/1999 Kurano et al. ............... 707/100

(Continued)

FOREIGN PATENT DOCUMENTS

CN          1103095          5/1995

(Continued)

OTHER PUBLICATIONS

Office Action issued Jul. 18, 2008 by the Chinese Patent Office in counterpart Chinese Patent Application No. 200480018634.4 (with English translation).

(Continued)

*Primary Examiner*—Thai Tran
*Assistant Examiner*—Syed Y Hasan
(74) *Attorney, Agent, or Firm*—Harness, Dickey & Pierce, P.L.C.

(57) ABSTRACT

A recording medium having a data structure for managing additional content data of main data recorded thereon in accordance with the present invention comprises a data area storing at least one clip file including main data and/or additional content data of the main data; and a navigation area storing a clip information file including information to indicate whether the clip file includes additional content data.

15 Claims, 9 Drawing Sheets

U.S. PATENT DOCUMENTS

| | | | |
|---|---|---|---|
| 7,346,920 B2 * | 3/2008 | Lamkin et al. | 725/112 |
| 2002/0106193 A1 * | 8/2002 | Park et al. | 386/95 |
| 2002/0135607 A1 * | 9/2002 | Kato et al. | 345/716 |
| 2003/0072453 A1 * | 4/2003 | Kelly et al. | 380/278 |
| 2003/0161615 A1 * | 8/2003 | Tsumagari et al. | 386/95 |
| 2004/0100492 A1 * | 5/2004 | Mercs | 345/744 |
| 2004/0101285 A1 | 5/2004 | Seo et al. | |

FOREIGN PATENT DOCUMENTS

| | | |
|---|---|---|
| EP | 0 737 009 | 1/2000 |
| EP | 1 198 133 | 4/2002 |
| EP | 0 737 979 | 10/2006 |
| JP | 2001-256004 | 9/2001 |
| JP | 2002-112177 | 4/2002 |
| JP | 2003-100013 | 4/2003 |
| WO | WO 2004/100048 | 11/2004 |

OTHER PUBLICATIONS

International Search Report (issued Aug. 26, 2004), issued from ISA with respect to International Patent Application No. PCT/KR2004/001187, filed May 19, 2004.

Extended European Search Report (issued Jul. 11, 2007), issued from European Patent Office with respect to European Patent Application No. 04733988.2, filed on May 19, 2004.

XP002395959.

* cited by examiner

| Value | Description |
| --- | --- |
| 0x02 | MPEG-2 video stream |
| 0x80 | HDMV LPCM audio stream |
| 0x81 | Dolby AC-3 audio stream |
| 0x82 | dts audio stream |
| 0x90 | Subtitle graphics stream |
| 0x91 | Interactive graphics stream |
| 0x99 | ENAV stream |

*Alignment of AV & ENAV Data on a BD-ROM*

*ClipInfo - Syntax*

| ClipInfo () { | no.of bits |
|---|---|
| Length | 32 |
| reserved_for_future_use | 8 |
| application_type | 8 |
| Clip_stream_type | 8 |
| Clip_stream_ext_type | 8 |
| reserved_for_future_use | 40 |
| TS_recording_rate | 32 |
| num_of_source_packets | 32 |
| reserved_for_future_use | 1024 |
| TS_recording_info_block () | |
| } | |

*ClipInfo - Syntax*

| ClipInfo () { | no.of bits |
|---|---|
| Length | 32 |
| reserved_for_future_use | 8 |
| application_type | 8 |
| Clip_stream_type | 8 |
| Clip_stream_ext_type | 8 |
| reserved_for_future_use | 40 |
| - - - - | |
| TS_recording_info_block () | |
| } | |

*ClipInfo - Syntax*

| ClipInfo () { | no.of bits |
|---|---|
| Length | 32 |
| reserved_for_future_use | 8 |
| application_type | 8 |
| Clip_stream_type | 8 |
| Clip_stream_ext_type | 8 |
| reserved_for_future_use | 40 |
| - - - - | |
| TS_recording_info_block () | |
| } | |

RECORDING MEDIUM HAVING DATA STRUCTURE FOR MANAGING MAIN DATA ADDITIONAL CONTENT DATA THEREOF AND RECORDING AND REPRODUCING METHODS AND APPARATUSES

FOREIGN PRIORITY

The present invention claims priority under 35 U.S.C. 119 on Korean Application No. 10-2003-033664 filed May 27, 2003; the contents of which are incorporated by reference in their entirety.

BACKGROUND OF THE INVENTION

1. Field of the Invention

The present invention relates to a recording medium having a data structure for managing main data and additional content data recorded thereon as well as methods and apparatuses for reproduction and recording the data structure.

2. Description of the Related Art

The standardization of new high-density read only and rewritable optical disks capable of recording large amounts of high-quality video and audio data has been progressing rapidly and new optical disk related products are expected to be commercially available on the market in the near future. The Blu-ray Disc Rewritable (BD-RE) is one example of these new optical disks.

On the other hand, the standardization for high-density read-only optical disks such as the Blu-ray ROM (BD-ROM) is also still under way. An effective data structure for recording and managing additional contents associated with main video/audio data along with the main data on the high-density read-only optical disk such as a BD-ROM is not yet available.

SUMMARY OF THE INVENTION

It is an object of the present invention to provide a recording medium having a data structure for accommodating additional content data of main video data to file structure of the recording medium and managing them recorded thereon, and methods and apparatuses for recording and reproducing the video data on such a recording medium.

A recording medium having a data structure for managing main video data and its additional content data in accordance with the present invention is characterized in that it comprises: a data area storing at least one clip file including main data and/or additional content data of the main data; and a navigation area storing a clip information file including information to indicate whether the clip file includes additional content data.

In one embodiment, main data and its additional content data are interleaved each other in a single clip file.

In another embodiment, main data and its additional content data are recorded in separate clip files.

The present invention further provides apparatuses and methods for recording and reproducing the data structure according to the present invention, and recording and reproducing according to the present invention.

BRIEF DESCRIPTION OF THE DRAWINGS

The above features and other advantages of the present invention will be more clearly understood from the following detailed description taken in conjunction with the accompanying drawings, in which.

DETAILED DESCRIPTION OF THE PREFERRED EMBODIMENTS

In order that the invention may be fully understood, preferred embodiments thereof will now be described with reference to the accompanying drawings.

Figure 1:
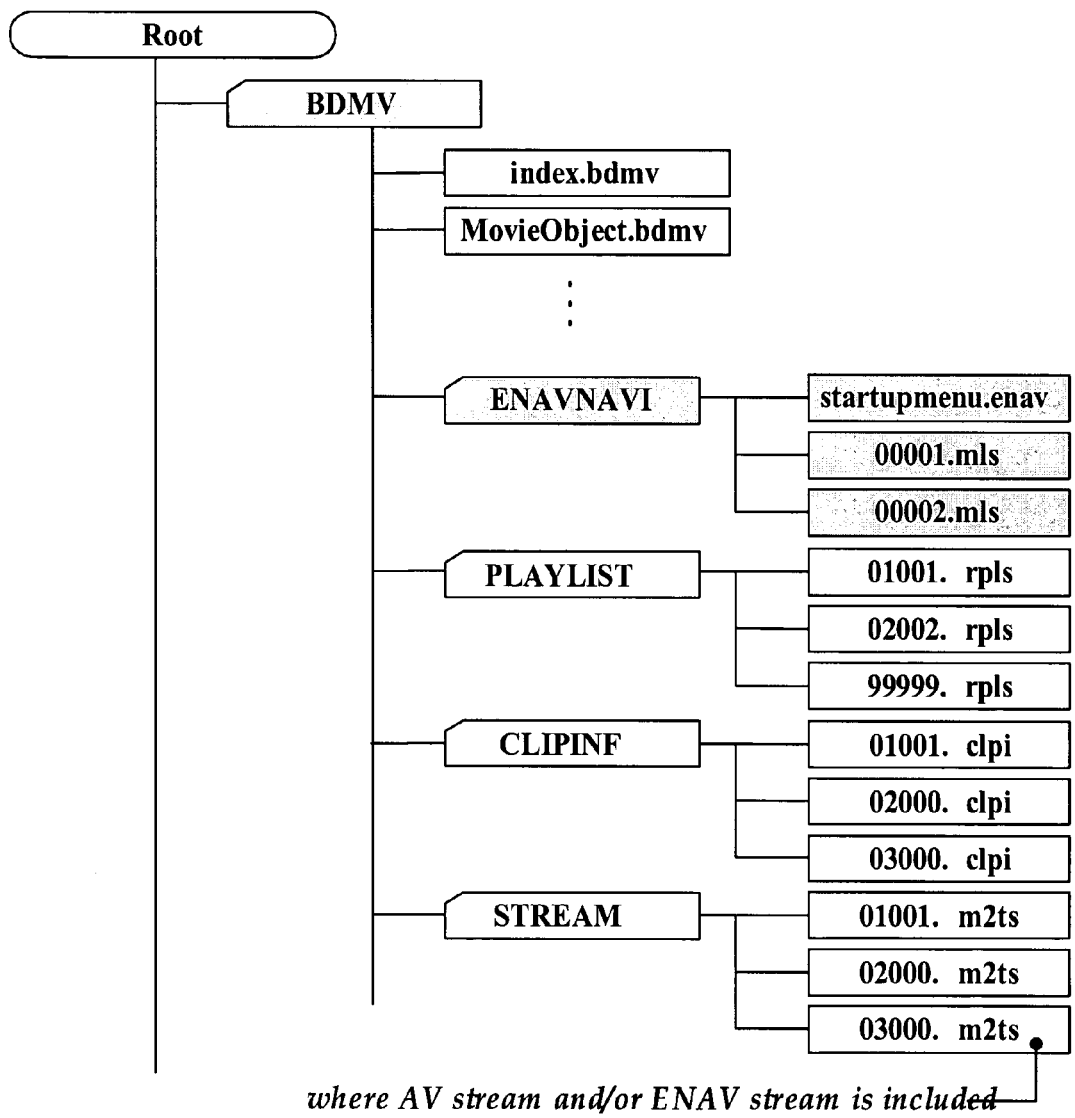
FIG. 1 illustrates an exemplary embodiment of a recording medium file or data structure according to the present invention.

A high-density optical disk, for example, a Blu-Ray ROM (BD-ROM) in accordance with the invention may have a file or data structure for managing reproduction of video and audio data as shown in FIG. 1.

As shown in FIG. 1, the root directory contains at least one BDMV directory. The BDMV directory includes an index file 'index.bdmv', a movie object file 'MovieObject.bdmv', a PLAYLIST directory in which playlist files (e.g., real (*.rpls) and virtual (*.vpls)) are stored, a CLIPINF directory in which clip information files (*.clpi) are stored, a STREAM directory in which MPEG2-formatted A/V stream clip files (*.m2ts), corresponding to the clip information files, are stored, and an ENAVNAVI directory in which a startup menu file 'startupmenu.enav' for additional content data and navigation information files (*.mls) for additional content data included in stream clip files are stored. The structure of the ENAVNAVI directory will be described in detail below.

The index file 'index.bdmv' included in the BDMV directory stores information to describe the content of the BDMV directory. The movie object file 'MovieObject.bdmv' stores information of one or more movie objects. The movie object associated with one or more playlists, consists of at least one executable navigation command, that is, the movie object is a navigation command group and each command of the group is to manage reproduction of data included in at least one clip file pertaining to the movie object.

The STREAM directory includes MPEG2-formatted A/V stream files called clips (*.m2ts). Each clip file includes only A/V stream or both stream of A/V and additional content data. Main A/V and additional content data in a single clip file are multiplexed or interleaved each other in a certain unit, e.g., in the unit of a PES (Packetized Elementary Stream) packet. The A/V stream includes source packets of video and audio data or additional content data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID (s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number).

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

A playlist directory may include real playlists (*.rpls) and virtual playlists (*.vpls). A real playlist can only use clips. Namely, the real playlist is considered as referring to parts of clips, and therefore, conceptually considered equivalent in disk space to the referred to parts of the clips.

Figure 2:
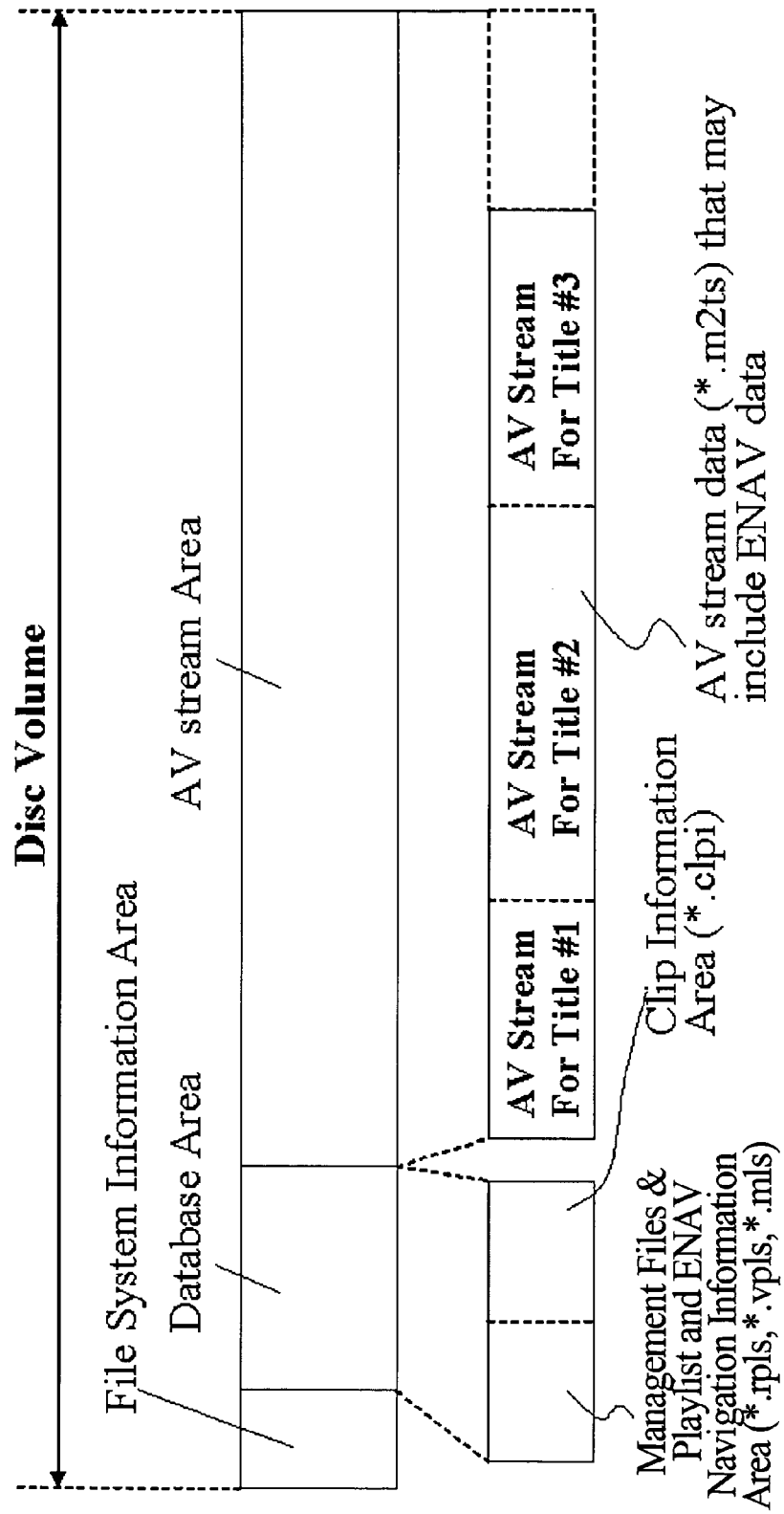
FIG. 2 illustrates an example of a recording medium having the data structure of FIG. 1 stored thereon.

In addition to illustrating the data structure of the recording medium according to an embodiment of the present invention, FIG. 1 represents the areas of the recording medium. For example, the management information file (index.bdmv, Movieobject.bdmv) is recorded in one or more management information areas, the playlist directory is recorded in one or more playlist directory areas, each playlist in a playlist directory is recorded in one or more playlist areas of the recording medium, etc. FIG. 2 illustrates an example of a recording medium having the data structure of FIG. 1 stored thereon. As shown, the recording medium includes a file system information area, a data base area and an A/V stream area.

The data base area includes a management information file and playlist and additional content navigation information area and a clip information area. The management information file and playlist and additional content navigation information area have the management information files 'index-.bdmv' and 'MovieObject.bdmv' recorded in a general information file area thereof, the ENAVNAVI directory and navigation information files recorded therein, and the PLAYLIST directory and playlist files recorded in a playlist information area thereof. The clip information area has the CLIP-INFO directory and associated clip information files recorded therein. The A/V stream area has the A/V streams (where only A/V data is contained or additional content data is interleaved) for the various titles and/or ENAV streams recorded therein. The additional content data can be recorded as a separate clip file (*.m2ts) instead of being interleaved with A/V stream.

Video and audio data are typically organized as individual titles; for example, different movies represented by the video and audio data are organized as different titles. Furthermore, a title may be organized into individual chapters in much the same way a book is often organized into chapters.

Figure 3:
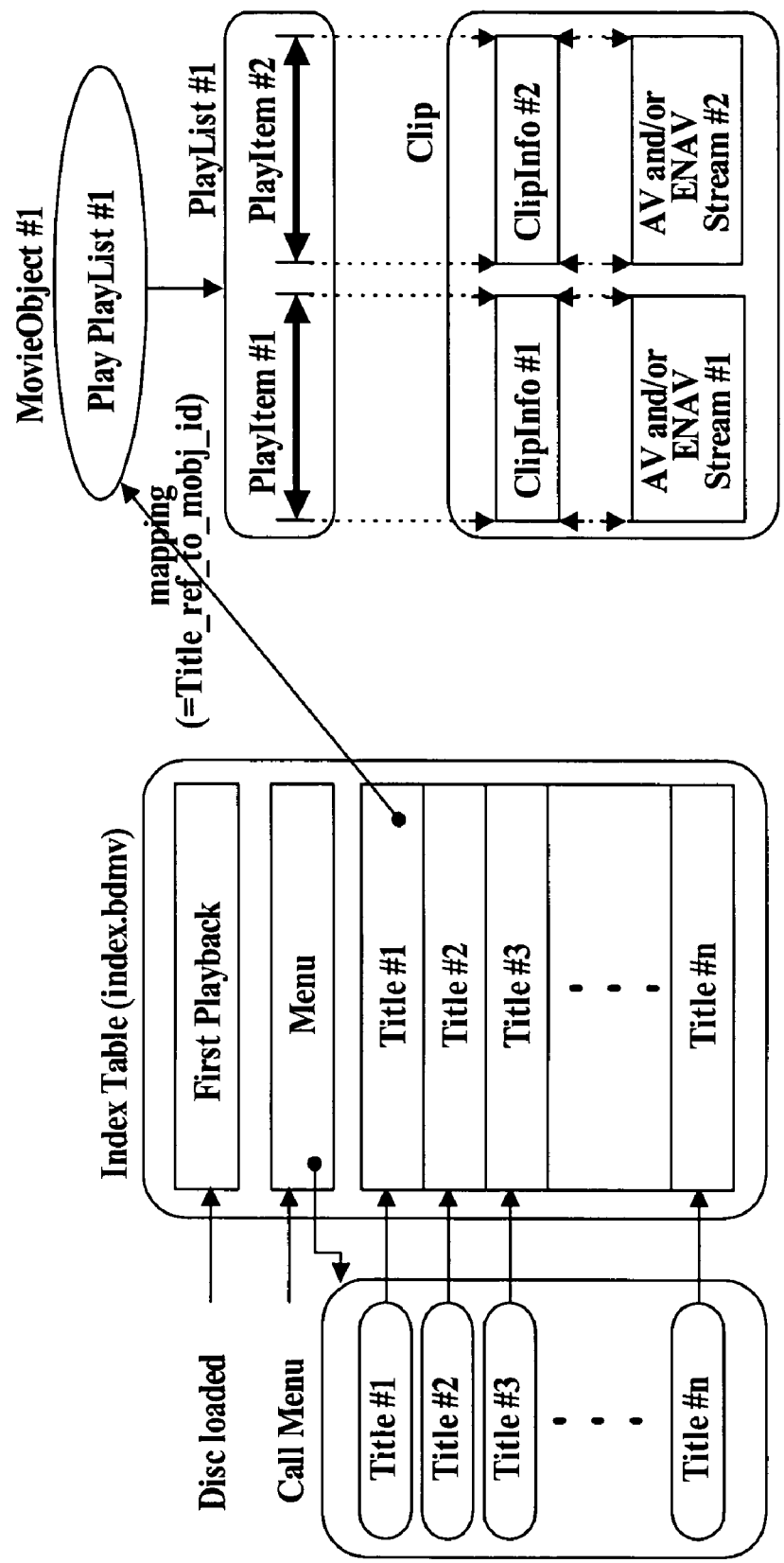
FIG. 3 illustrates a data structure recorded on a BD-ROM in accordance with the present invention.

The data structure according to the present invention includes an illustrative structure shown in FIG. 3 and also includes navigation information for managing main video data and additional content data in the structure of FIG. 3 recorded on the recording medium.

In the data structure of FIG. 3, the index file index.bdmv includes an index table 'Index Table' having the main menu 'Menu' and title information and a first playback 'First Playback' information, and the information in the index table performs reproduction of a corresponding data through link information one to one mapping the specific object in the corresponding object file 'MovieObject.bdmv'.

Accordingly, the main menu information in the index table 'Index Table' is performed by a user request "Call Menu", and in the main menu, a basic title menu 'Title' is included, thus the user can select one of the title menu the user want to reproduce.

If the user selected the title #1, the title #1 is mapped to an object i.e., MovieObject #1 determined by link information in the title #1 information of the index table, the play list, for example PlayList #1, determined by corresponding command in the corresponding object is reproduced.

The play list PlayList #1 including at least one plat item PlayItem performs the clip file 'Clip' for reproducing the specific data, e.g., video data and/or additional content data corresponding to the title #1.

The first playback 'First Playback' information in the index table 'Index Table', the first playback information including link information being automatically loaded when the disc is loaded, is reproduced by the play list file and clip file in the same way the title #1 is reproduced.

Accordingly, in the process for reproducing the corresponding title, started from the main menu, although the user can select the method for reproduction only through the main menu information, the main menu is limitedly provided with only main menu information needed for the total disc, and there is a limitation in properly providing the main menu according to the attribution of the recorded data, e.g., video data and/or additional content data.

The data structure according to the present invention also includes navigation information for managing main video data and additional content data recorded on the recording medium.

The data structures writing according to the present invention may be applicable to the manufacturing process in case of a read-only disk like BD-ROM.

The additional content data written in an MPEG2 transport stream clip file (*.m2ts) consists of language data, e.g., HTML or XHTML markup language data or Java script. The additional content data may be called 'ENAV' (Enhanced Audio Video or Enhanced NAVigation) data, therefore, 'ENAV data' denoted hereinafter means such additional content data. The navigation information for the additional content data is written under the directory 'ENAVNAVI' as aforementioned or in a clip information file under the directory 'CLIPINF'.

The startup menu file 'startupmenu.enav' has data, e.g., script of markup language to make and present menu items for the additional content navigation files (*.mls). The menu items are displayed onto a browser screen by execution of the script written in the startup menu file. The startup menu file 'startupmenu.enav' is initiated by a user's key input or a control operation of a disk apparatus conducted at an initial operation for reproduction.

The additional content navigation file (*.mls) has linking information to a clip file where ENAV data is included, a clip information file associated with the clip file, or a playlist file including the clip file in its playing sequence. The linking information can be filename of the additional content navigation file. The additional content navigation file includes reproduction managing information, e.g., information of an interleaving unit and location of start ENAV data packet in a stream for ENAV data interleaved with main A/V data in the event that the ENAV data is interleaved with the main A/V data, and further includes script information to initialize necessary devices and/or browser for presentation of the ENAV data.

Figures 4, 5:
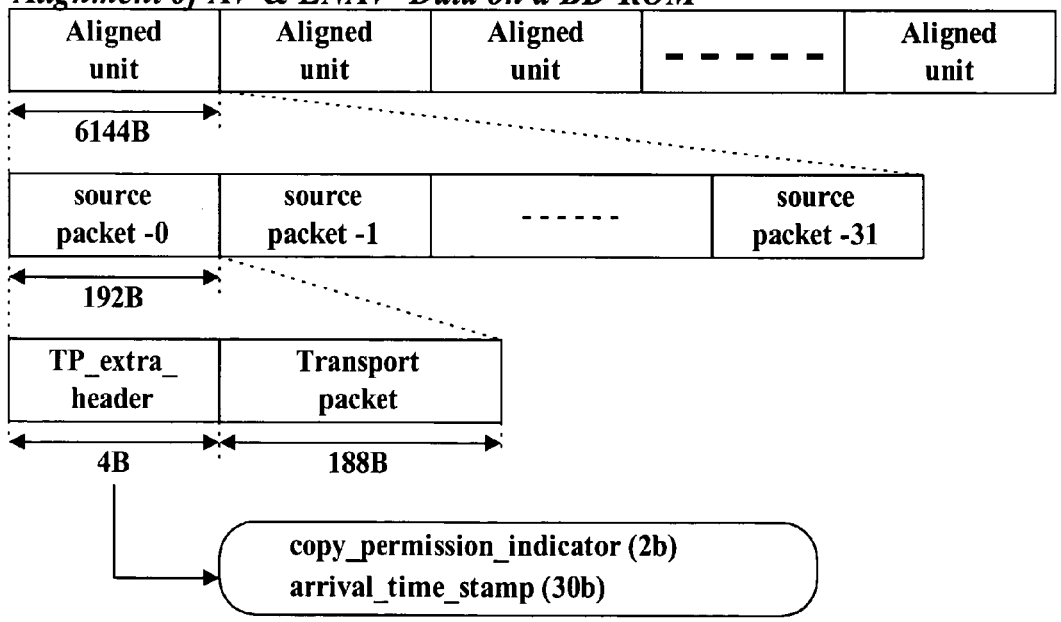
FIG. 4 shows an illustrative table to assign stream IDs to various streams recorded on a BD-ROM.
FIG. 5 illustrates interleaved alignment of main A/V data and additional ENAV data on a BD-ROM according to the present invention.
Figure 6:
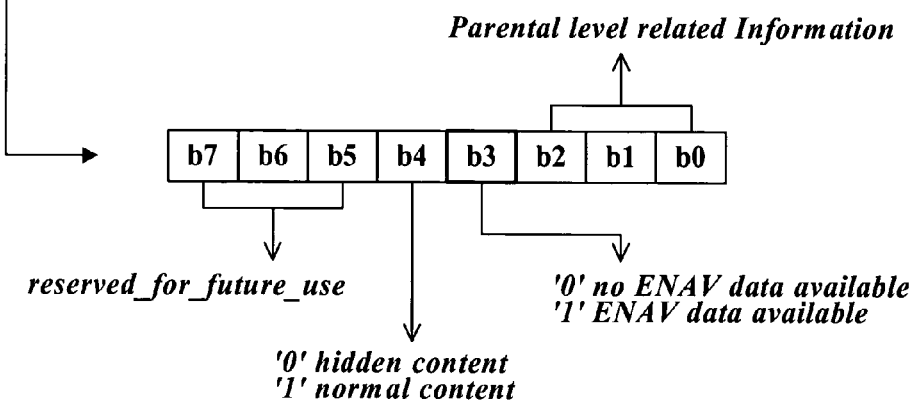
FIG. 6 shows structures of a clip information file and an additional content data related field included therein in accordance with an embodiment of the present invention.

The ENAV data has a unique ID that is different from those assigned to main A/V stream. FIG. 4 shows an ID assignment table where 0x02 is assigned to a video stream, 0x80, 0x81 and 0x82 to an audio stream, 0x90 to a subtitle graphic stream, 0x91 to an interactive graphic stream, and new value, 0x99 to the ENAV data stream. The newly assigned value, 0x99 is written in a header of, e.g., PES packet including ENAV data in its body.

In the event that ENAV stream is interleaved with main A/V stream in an A/V clip file, the main A/V stream and the ENAV stream can be interleaved each other in a predetermined-sized unit not a PES packet. For example, they can be interleaved by three sectors (6144(=3×2048) bytes in size) as shown in FIG. 5. One aligning unit (three sectors) includes 32 transport packets, each consisting of 4-byte TP extra header and 188-byte body. The 30-bit ATS (arrival time stamp) in the TP extra header can be used to synchronize main A/V data and ENAV data.

Each of clip information files associated with clip files respectively stores attributes of the associated clip file that include information to indicate whether ENAV data is stored in a clip file, information to indicate whether network authorization is required to present the ENAV data, and parental level information for the ENAV data. This information is stored in an 8-bit-long field of clip stream extension type 'Clip_Stream_ext_type' as shown in FIG. 5.

The parental level information is stored in the three LSBs b2:b1:b0 of the field, the information to indicate whether ENAV data is stored or not is in the fourth LSB b3, and the information to indicate whether network authorization is required or not is in the fifth LSB b4. The remaining three MSBs b7:b6:b5 of the field are reserved for future use.

The fourth LSB 'b3' means 'no ENAV stream' in an associated clip file in case of '0' and 'existence of ENAV stream' in case of '1'. For the fifth LSB 'b4', its value '0' means that network authorization is required to present an associated ENAV stream while its value '1' means no authorization. If the ENAV stream is encrypted, it is general to set the fifth LSB to zero.

The additional content navigation file (*.mls) under the directory 'ENAVNAVI' associated with an ENAV stream stores network address, e.g., URL (Uniform Resource Locator) of a content providing server that conducts the authorization and provides decryption key, if authorized, or permits presentation of the ENAV stream. The network address may be stored in a predetermined area of the BD-ROM instead of the additional content navigation file.

Figure 7A:
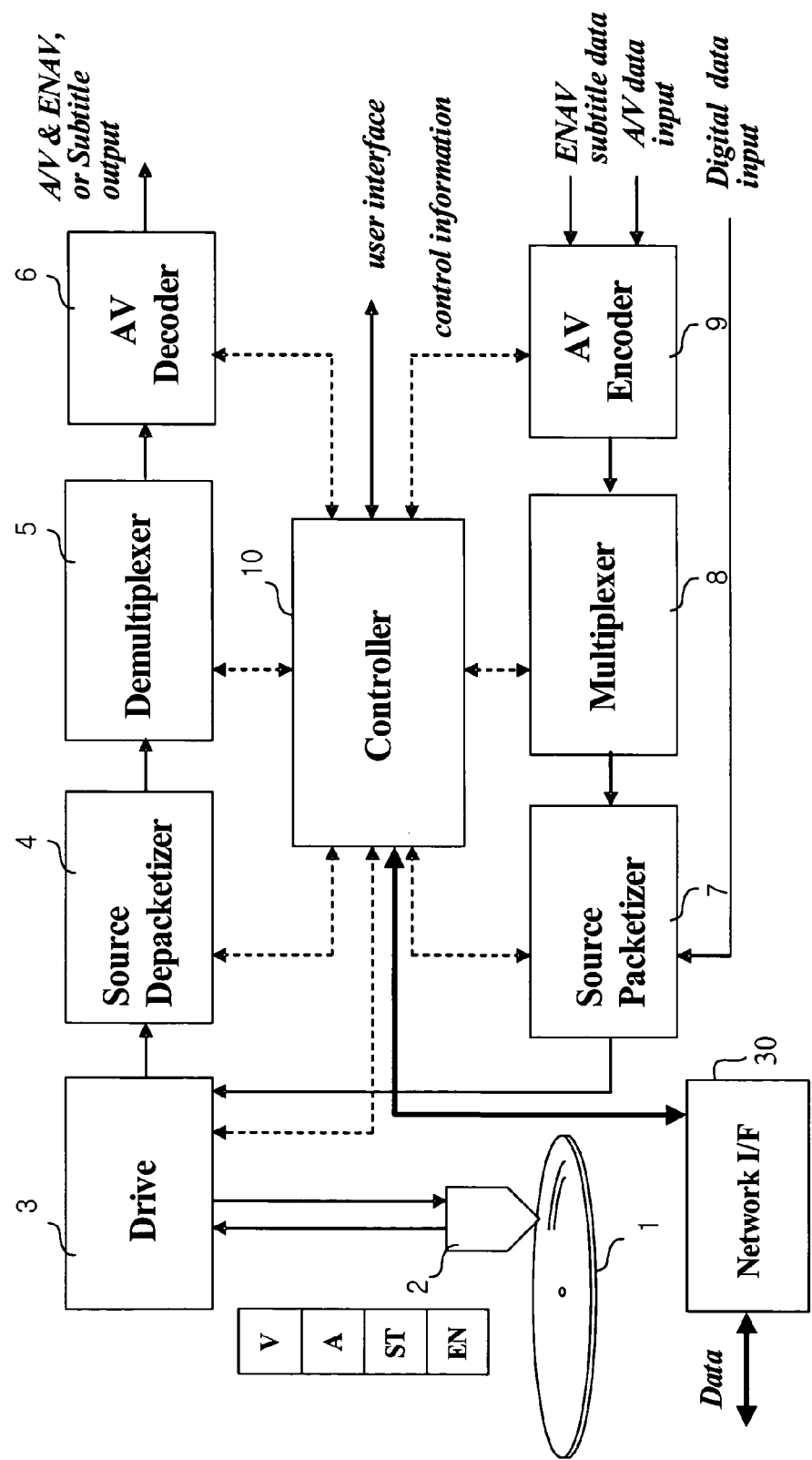
FIGS. 7A and 7B illustrate schematic diagrams of an embodiment of an optical disk recording and reproducing apparatus according to the present invention.

FIG. 7A illustrates a schematic diagram of an embodiment of an optical disk recording and reproducing apparatus according to the present invention. As shown, an AV encoder 9 receives and encodes audio and video data, subtitle data, or ENAV data. The AV encoder 9 outputs the encoded audio and video data along with coding information and stream attribute information. A multiplexer 8 multiplexes the encoded audio and video data (or subtitle data, ENAV data) based on the coding information and stream attribute information to create, for example, an MPEG-2 transport stream. A source packetizer 7 packetizes the transport packets from the multiplexer 8 into source packets in accordance with the audio/video, subtitle, or ENAV format of the optical disk. As shown in FIG. 7A, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk. In case that audio/video and ENAV data are intended to be stored in a single clip file, the controller 10 controls the source packetizer 7 to align the audio/video data packets and ENAV data packets in interleaved manner. Otherwise, the controller 10 controls the drive 3 to record the audio/video data and the ENAV data in separate files.

The controller 10 also creates the navigation and management information for managing reproduction of the audio/video data and ENAV data being recorded on the optical disk. For example, based on information received via the user interface (e.g., instruction set saved on disk, provided over an intranet or internet by a computer system, etc.) the controller 10 controls the drive 3 to record the data structure of FIGS. 1 to 6, 8 and 9 on the optical disk.

In the process of reproduction, the controller 10 controls the drive 3 to reproduce this data structure from the optical disk. Based on the information contained therein, as well as user input received over the user interface (e.g., control buttons on the recording and reproducing apparatus or a remote associated with the apparatus), the controller 10 controls the drive 3 to reproduce the audio/video and/or ENAV source packets from the optical disk. For example, the user input may specify a playlist or a title to reproduce. This user input may be specified, for example, via a menu based graphical user interface preprogrammed into the controller 10. Using the user input and the management and navigation information reproduced from the optical disk, the controller 10 controls the sequential reproduction of clip files associated with the specified title or playlist.

For example, if a title or a playlist is chosen, the controller 10 examines management information for the chosen title or playlist, and determines the first clip file pertaining to the title or playlist. Afterwards, the controller 10 examines the clip stream extension type 'Clip_Stream_ext_type' written in a clip information file under the CLIPINF directory associated with the first clip file to know whether the clip file includes ENAV data. If ENAV data is included, that is, if the fourth LSB b3 of the clip stream extension type is '1', the controller 10 controls a demultiplexer and an AV decoder 6 to separate, if interleaved with AV data, and decode the ENAV data accordingly, otherwise, it conducts ordinary reproducing operation of the A/V clip file.

By the way, if the fifth LSB b4 is zero, the controller 10 suspends the presentation of the clip file and controls a network interface 30 to conduct an authorizing process with a content providing server that is identified by a network address written in an additional content navigation file associated with the ENAV data. After successful authorization, the controller checks the ENAV data included in the clip file is encrypted. If encrypted, the controller controls the network interface 30 to receive an adequate decryption key from the content providing server, sends the received decryption key to the AV decoder 6, and starts to reproduce the clip file. If not encrypted, the controller 10 conducts the reproduction of the clip file immediately.

If parental locking function is activated in the disk apparatus of FIG. 7A, the controller 10 examines the value stored in the three LSBs b2:b1:b0 of the clip stream extension type before conducting presentation of the ENAV stream. If the parental level set in the disk apparatus permits the stored value, the controller 10 conducts the aforementioned reproduction of the ENAV stream, otherwise, the controller does not.

The reproduced source packets are received by a source depacketizer 4 and converted into a data stream (e.g., an MPEG-2 transport packet stream). The demultiplexer 5 demultiplexes the data stream into encoded video and audio, ENAV, and/or subtitle data. The AV decoder 6 decodes the encoded data to produce the original audio and video, ENAV, and/or subtitle data that was fed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

Figure 7B:
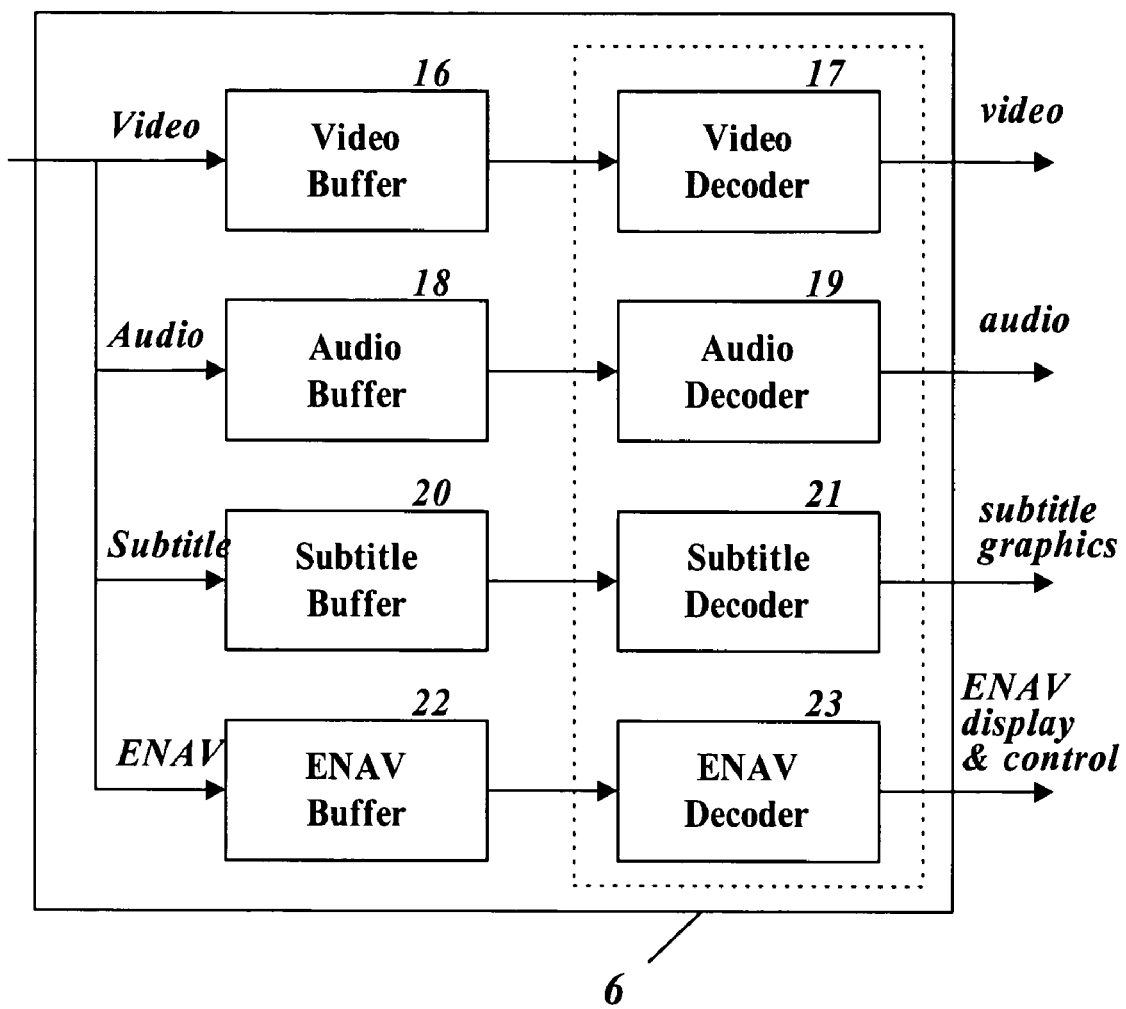

The AV decoder 6 has the detailed structure shown FIG. 7B to decode subtitle and ENAV data as well as audio and video data. That is, the AV decoder 6 comprises four buffers 16,18, 20,22 for buffering demultiplexed video, audio, subtitle and ENAV data, respectively and four sub-decoders 17,19,21,23 for decoding out the buffered data adequately. If the ENAV data is a markup language script or Java script, the ENAV sub-decoder 23 interprets the ENAV data, instead of decoding, to conduct interpreted operations with the aid of the controller 10.

On the other hand, the controller 10 reads the startup menu file 'startupmenu.enav' under the ENAV\NAVI directory and executes the script written therein at a user's request or at initial controlling operation, thereby displaying menu items related with ENAV data on a displaying browser. If a certain menu item is selected, the controller 10 conducts an ENAV data reproducing operation pre-assigned to the selected menu item.

While FIG. 7A has been described as a recording and reproducing apparatus, it will be understood that only a recording or only a reproducing apparatus may be provided using those portions of FIG. 7A providing the recording or reproducing function.

Figure 8:
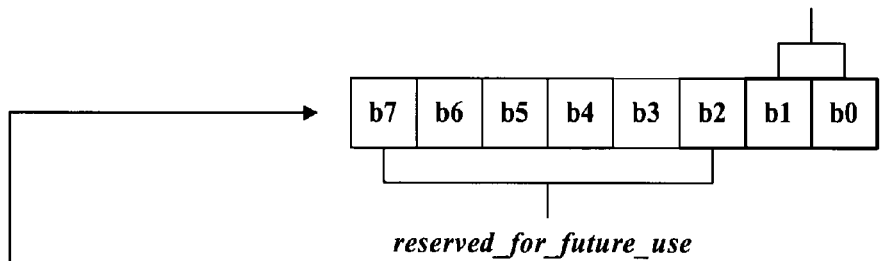
FIG. 8 shows structures of a clip information file and an additional content data related field included therein in accordance with another embodiment of the present invention.
Figure 8:
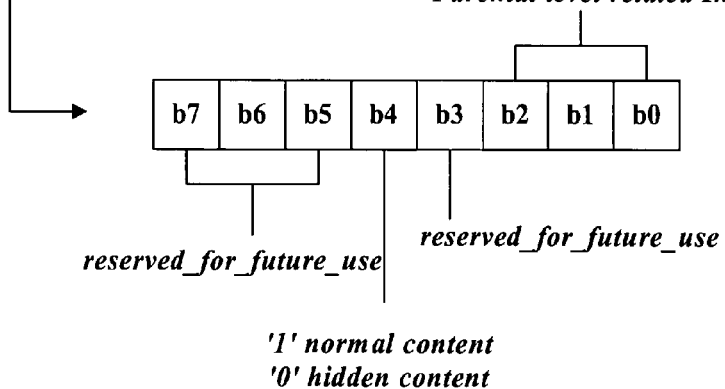

As different embodiments of the present invention, additional content related information can be written in a field, e.g., an application type field 'application_type' other than the aforementioned clip stream extension type field, as shown in FIGS. 7 and 8.

In the embodiment of FIG. 8, the 1-bit information to indicate whether additional content data is included in a clip file is not allocated in the clip stream extension type, instead, two LSBs b1:b0 for additional content data are allocated in the application type field. If only AV data is included in an associated clip file, '00' is written in the two bits, if both of AV data and ENAV data are included in interleaved way, '01' in the two bits, and if only ENAV data is included, '10' in the two bits.

Figure 9:
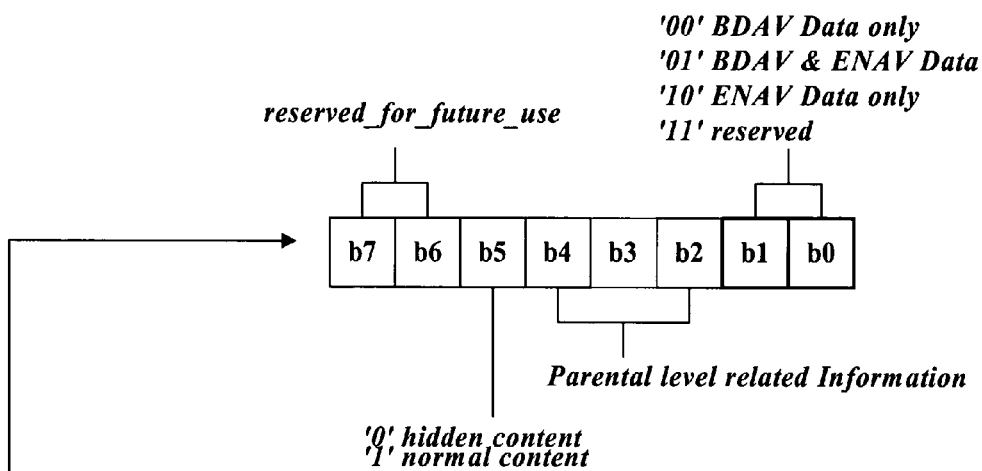
FIG. 9 shows structures of a clip information file and an additional content data related field included therein in accordance with still another embodiment of the present invention.

In the embodiment of FIG. 9, the two LSBs b1:b0 of the application type field are used the same way they are used in the embodiment of FIG. 8, the next three LSBs b4:b3:b2 are allocated to store parental level information, and the sixth LSB b5 stores information to indicate whether network authorization is required to play ENAV data included in a clip file.

While the invention has been disclosed with respect to a limited number of embodiments, those skilled in the art, having the benefit of this disclosure, will appreciated numerous modifications and variations therefrom. It is intended that all such modifications and variations fall within the spirit and scope of the invention.

The present invention, disclosed with respect to a limited number of embodiments, provides flexibility in recording, later distribution and reproduction of additional content data of main audio/video data recorded on a recording medium.

What is claimed is:

1. An optical disk having a data structure for managing additional content data of main data recorded on the recording medium, comprising:
   a data area storing at least one clip file including main data and/or additional content data of the main data; and
   a navigation area storing a clip information file and a playlist file, the playlist file being provided for reproduction paths of the clip files, the clip information file including at least two information, a first information to indicate whether the clip file includes additional content data and a second information to indicate parental level of additional content data in case that additional content data is included in the clip file, the first information is written in a clip stream extension type field allocated in the clip information file, the playlist file including information indicating a playback time information of the clip file, and the playlist file is written in an extension type field different from the clip stream extension type field.

2. The optical disk of claim 1, wherein the clip information file further includes information to indicate whether network authorization is required to play additional content data.

3. The optical disk of claim 2, wherein the optical disk stores a network address of an external content providing server that conducts the network authorization.

4. The optical disk of claim 3, wherein an additional content navigation file associated with the additional content data stores the network address.

5. The optical disk of claim 1, wherein the first information is written in an application type field allocated in the clip information file.

6. The optical disk of claim 1, wherein the additional content data is interleaved with the main video data in the clip file.

7. The optical disk of claim 1, wherein the at least one clip file includes only additional content data.

8. The optical disk of claim 1, wherein the additional content data has a stream ID different from that of the main data.

9. The optical disk of claim 1, wherein, in case that additional content data is included in the clip file, the first information distinguishes a first case where only additional content data is included from a second case where additional content data is included along with main data.

10. A method for recording a data structure for managing additional content data on a recording medium, comprising:
recording at least one clip file including main data and/or additional content data of the main data in a data area on the recording medium; and
recording, in a navigation area on the recording medium, a clip information file and a playlist file, the playlist file being provided for reproduction paths of the clip files, the clip information file including at least two information, a first information to indicate whether the clip file includes additional content data and a second information to indicate parental level of additional content data in case that additional content data is included in the clip file, the first information is written in a clip stream extension type field allocated in the clip information file, the playlist file including information indicating a playback time information of the clip file, and the playlist file is written in an extension type field different from the clip stream extension type field.

11. The method of claim 10, wherein, in case that additional content data is included in the clip file, the first information distinguishes a first case where only additional content data is included from a second case where additional content data is included along with main data.

12. An apparatus for recording a data structure for managing additional content data thereof on a recording medium, comprising:
an optical pickup configured to record data on the recording medium;
an encoder configured to encode main data and/or additional content data of the main data; and
a controller configured to control the optical pickup to record the encoded data as at least one clip file in a data area on the recording medium and to record, in a navigation area on the recording medium, a clip information file and a playlist file, the playlist file being provided for reproduction paths of the clip files, the clip information file including at least two information, a first information to indicate whether the clip file includes additional content data and a second information to indicate parental level of additional content data in case that additional content data is included in the clip file, the first information is written in a clip stream extension type field allocated in the clip information file, the playlist file including information indicating a playback time information of the clip file, and the playlist file is written in an extension type field different from the clip stream extension type field.

13. The apparatus of claim 12, wherein, in case that additional content data is included in the clip file, the first information distinguishes a first case where only additional content data is included from a second case where additional content data is included along with main data.

14. A method for reproducing a data structure for managing additional content data recorded on a recording medium, comprising:
reproducing a clip information file and a playlist file from the recording medium, the clip information file is associated with a clip file, the clip file including main data and/or additional content data of the main data, the playlist file being provided for reproduction paths of the clip files, and the clip information file including at least two information; and
examining a first information to determine whether the clip file includes additional content data, the first information is written in a clip stream extension type field allocated in the clip information file, and making presentation of the additional data included in the clip file, if included,
wherein a second information is to indicate parental level of additional content data in case that additional content data is included in the clip file, the playlist file including information indicating a playback time information of the clip file, and the playlist file is written in an extension type field different from the clip stream extension type field.

15. An apparatus for reproducing a data structure for managing additional content data recorded on a recording medium, comprising:
an optical pickup configured to reproduce data recorded on the recording medium;
a decoder configured to present or interpret the reproduced data; and
a controller configured to control the optical pickup to reproduce a clip information file and a playlist file from the recording medium, the clip information file is associated with a clip file, the clip file Including main data and/or additional content data of the main data, the playlist file being provided for reproduction paths of the clip files, the clip information file including at least two information, the controller configured to examine first information written in the clip information file to determine whether the clip file includes additional content data, the first information is written in a clip stream extension type field allocated in the clip information file, and control the decoder to present the additional data included in the clip file, if included,
wherein a second information is to indicate parental level of additional content data in case that additional content data is included in the clip file, the playlist file including information indicating a playback time information of the clip file, and the playlist file is written in an extension type field different from the clip stream extension type field.

* * * * *